United States Patent
Kuo et al.

(10) Patent No.: US 7,478,620 B2
(45) Date of Patent: Jan. 20, 2009

(54) METHOD AND APPARATUS TO CONTROL A TRANSITION BETWEEN HCCI AND SI COMBUSTION IN A DIRECT-INJECTION GASOLINE ENGINE

(75) Inventors: Tang-Wei Kuo, Troy, MI (US); Paul M. Najt, Bloomfield Hills, MI (US); Nicole Wermuth, Ann Arbor, MI (US); James A. Eng, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/749,823

(22) Filed: May 17, 2007

(65) Prior Publication Data

US 2007/0272202 A1 Nov. 29, 2007

Related U.S. Application Data

(60) Provisional application No. 60/808,292, filed on May 25, 2006.

(51) Int. Cl.
  *F02B 17/00* (2006.01)
  *F02B 5/00* (2006.01)
  *F01L 1/34* (2006.01)
  *G06F 17/00* (2006.01)
(52) U.S. Cl. .................. 123/294; 123/481; 123/435
(58) Field of Classification Search ........ 123/27 R, 123/198 F, 294, 435, 481, 295, 299, 305, 123/443, 198 D
See application file for complete search history.

(56) References Cited

U.S. PATENT DOCUMENTS

| | | | | |
|---|---|---|---|---|
| 6,662,785 | B1 * | 12/2003 | Sloane et al. | 123/481 |
| 6,840,237 | B2 * | 1/2005 | Strom et al. | 123/684 |
| 6,904,752 | B2 * | 6/2005 | Foster et al. | 60/295 |
| 7,000,586 | B2 | 2/2006 | Kato et al. | |
| 2007/0193557 | A1 * | 8/2007 | Brevick et al. | 123/481 |

FOREIGN PATENT DOCUMENTS

EP  1 612 393 A1  4/2006
WO  WO 2006/032886 A2  3/2006

* cited by examiner

*Primary Examiner*—Stephen K Cronin
*Assistant Examiner*—Arnold Castro

(57) ABSTRACT

A method to operate a multi-cylinder direct-injection engine in one of a controlled auto-ignition and a spark-ignition combustion mode is described. Engine operation and an operator torque request are monitored. Fuel delivery to a portion of the cylinders is selectively deactivated and torque output from non-deactivated cylinders is selectively increased to achieve the operator torque request when the monitored engine operation is above a predetermined threshold. An engine operating point at which an engine load demand exceeds an operating capability of the engine in a stoichiometric HCCI mode is identified. The engine is selectively operated in an unthrottled spark-ignition mode with at least one cylinder unfueled and torque output from the remaining cylinders is selectively increased.

22 Claims, 2 Drawing Sheets

METHOD AND APPARATUS TO CONTROL A TRANSITION BETWEEN HCCI AND SI COMBUSTION IN A DIRECT-INJECTION GASOLINE ENGINE

CROSS REFERENCE TO RELATED APPLICATIONS

This application claims priority from U.S. Provisional Application No. 60/808,292, filed May 25, 2006 which is hereby incorporated herein by reference.

TECHNICAL FIELD

This invention pertains generally to internal combustion engine control systems, and more specifically to a method and apparatus to control operation of a homogeneous-charge compression-ignition engine.

BACKGROUND OF THE INVENTION

The statements in this section merely provide background information related to the present disclosure and may not constitute prior art.

Internal combustion engines, especially automotive internal combustion engines, generally fall into one of two categories, spark-ignition engines and compression-ignition engines. Conventional spark-ignition engines, such as gasoline engines, typically function by introducing a fuel/air mixture into the combustion cylinders, which is then compressed in the compression stroke and ignited by a spark plug. Conventional compression-ignition engines, such as diesel engines, typically function by introducing or injecting pressurized fuel into a combustion cylinder near top dead center (TDC) of the compression stroke, which ignites upon injection. Combustion for both conventional gasoline engines and diesel engines involves premixed or diffusion flames that are controlled by fluid mechanics. Each type of engine has advantages and disadvantages. In general, gasoline engines produce fewer emissions but are less efficient, while, in general, diesel engines are more efficient but produce more emissions.

More recently, other types of combustion methodologies have been introduced for internal combustion engines. One such engine system comprises an internal combustion engine designed to operate in a controlled auto-ignition mode under specific engine operating conditions to achieve improved engine fuel efficiency, also referred to as homogeneous charge compression-ignition (HCCI) combustion mode. A spark-ignition system is employed to supplement the auto-ignition combustion process during specific operating conditions.

A typical HCCI engine operates in either the controlled auto-ignition combustion mode or the spark-ignition mode depending upon the engine speed and load. The HCCI combustion mode comprises a distributed, flameless, auto-ignition combustion process that is controlled by oxidation chemistry, rather than by fluid mechanics. Ignition of a cylinder charge is caused by compression of the cylinder charge under specific engine operating conditions. In the typical engine operating in HCCI combustion mode, the cylinder charge is nearly homogeneous in composition, temperature, and residual level at intake valve closing time. The typical engine operating in the HCCI combustion mode can further operate using stratified charge fuel injection to control and modify the combustion process, including using stratified charge combustion to trigger the HCCI combustion. Because auto-ignition is a distributed kinetically-controlled combustion process, the engine operates at a very dilute fuel/air mixture (i.e., lean of a fuel/air stoichiometric point) and has a relatively low peak combustion temperature, thus forming extremely low NOx emissions. The fuel/air mixture for auto-ignition is relatively homogeneous, as compared to the stratified fuel/air combustion mixtures used in diesel engines, and, therefore, the rich zones that form smoke and particulate emissions in diesel engines are substantially eliminated. Because of this very dilute fuel/air mixture, an engine operating in the auto-ignition combustion mode can operate unthrottled to achieve diesel-like fuel economy. Furthermore, the HCCI engine can operate at stoichiometry with substantial amounts of EGR to achieve effective combustion. At medium engine speeds and loads, a combination of engine valve profile and timing (e.g., exhaust recompression and exhaust re-breathing) and fueling strategy has been found to be effective in providing adequate thermal energy to the cylinder charge so that auto-ignition during the compression stroke leads to stable combustion with low noise. One of the main issues in effectively operating an engine in the auto-ignition combustion mode has been to control the combustion process properly so that robust and stable combustion resulting in low emissions, optimal heat release rate, and low noise is achievable over a range of operating conditions. The benefits of auto-ignition combustion have been known for many years.

There is no direct control of start of combustion for an engine operating in the auto-ignition mode, as the chemical kinetics of the cylinder charge determine the start and course of the combustion. At engine operating conditions above certain limits, the HCCI engine transitions to spark-ignition combustion, at stoichiometry, in order to achieve stable combustion, manage emissions, and meet an operator torque request. The typical HCCI engine transitions between HCCI combustion mode and spark-ignition (SI) combustion mode, depending upon precalibrated and predetermined operating conditions. Often, the SI mode includes operating un-throttled at a stoichiometric air/fuel ratio.

The engine operating speed at which transition between HCCI and SI is possible is limited based upon engine hardware, especially the lift and duration of valve openings due to the camshaft profiles. By way of example, when a cam provides a four millimeter peak lift and an opening duration of 120 CA degrees, a transition between HCCI and SI operation has proven unachievable above an engine speed of about 2000 rpm.

It is advantageous to have a control system for a HCCI engine which effectively transitions between the HCCI combustion mode and the spark-ignition combustion mode. Furthermore, there is a need to effectively transition between SI and HCCI operation at higher engine operating speeds.

The invention described hereinafter comprises a method and a control scheme for operating the engine to control and maintain effective combustion during transitions between HCCI and SI combustion modes.

SUMMARY OF THE INVENTION

The present invention comprises a method to operate a multi-cylinder direct-injection engine. The engine selectively operates in one of a controlled auto-ignition combustion mode and a spark-ignition combustion mode. Engine operation and an operator torque request are monitored. Fuel delivery to a portion of the cylinders is selectively deactivated and torque output from non-deactivated cylinders is selectively increased to achieve the operator torque request when the monitored engine operation is above a predetermined threshold. The method comprises identifying an engine operating point at which an engine load demand exceeds an operating capability of the engine in stoichiometric HCCI mode. The engine is selectively operated in an unthrottled spark-ignition mode with a portion of the cylinders unfueled and torque output from the remaining fueled cylinders selectively increased.

BRIEF DESCRIPTION OF THE DRAWINGS

The invention may take physical form in certain parts and arrangement of parts, the embodiments of which are described in detail and illustrated in the accompanying drawings which form a part hereof, and wherein.

DESCRIPTION OF THE PREFERRED EMBODIMENT

Figure 1:
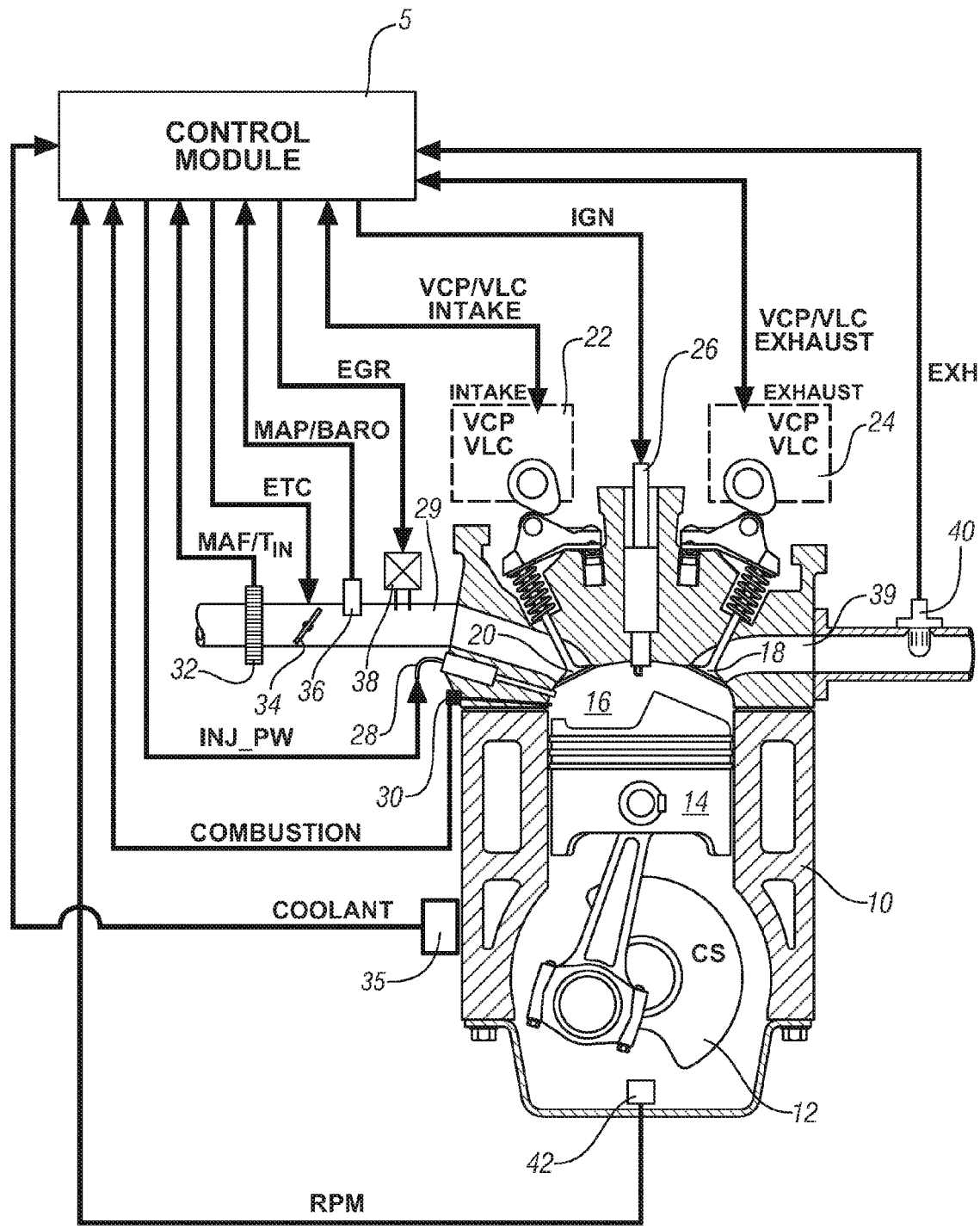
FIG. 1 is a schematic illustration of an internal combustion engine, in accordance with the present invention; and, FIG. 2 is a datagraph, in accordance with the present invention.

Referring now to the drawings, wherein the showings are for the purpose of illustrating the invention only and not for the purpose of limiting the same, FIGS. 1A and 1B schematically illustrate an exemplary embodiment . . . .

Referring now to the drawings, wherein the depictions are for the purpose of illustrating the invention only and not for the purpose of limiting the same, FIG. 1 depicts a schematic diagram of an internal combustion engine 10 and accompanying control module 5 that have been constructed in accordance with an embodiment of the invention.

The exemplary engine 10 comprises a multi-cylinder direct-injection four-stroke internal combustion engine having reciprocating pistons 14 slidably movable in cylinders which define variable volume combustion chambers 16. Each of the pistons is connected to a rotating crankshaft 12 ('CS') by which their linear reciprocating motion is translated to rotational motion. There is an air intake system which provides intake air to an intake manifold which directs and distributes the air into an intake runner 29 to each combustion chamber 16. The air intake system comprises airflow ductwork and devices for monitoring and controlling the air flow. The devices preferably include a mass airflow sensor 32 for monitoring mass airflow ('MAF') and intake air temperature ('Tin'). There is a throttle valve 34, preferably an electronically controlled device which controls air flow to the engine in response to a control signal ('ETC') from the control module. There is a pressure sensor 36 in the manifold adapted to monitor manifold absolute pressure ('MAP') and barometric pressure ('BARO'). There is an external flow passage for recirculating exhaust gases from engine exhaust to the intake manifold, having a flow control valve, referred to as an exhaust gas recirculation ('EGR') valve 38. The control module 5 is operative to control mass flow of exhaust gas to the engine air intake by controlling opening of the EGR valve. As used herein, the term 'cylinder structure' refers to the engine components and elements which form each combustion chamber, i.e., walls of cylinder, piston, and head, including intake and exhaust valves.

Air flow from the intake runner 29 into each of the combustion chambers 16 is controlled by one or more intake valves 20. Flow of combusted gases from each of the combustion chambers to an exhaust manifold via exhaust runners 39 is controlled by one or more exhaust valves 18. Openings and closings of the intake and exhaust valves are preferably controlled with a dual camshaft (as depicted), the rotations of which are linked and indexed with rotation of the crankshaft 12. The engine is equipped with devices for controlling phasing, lift and duration of openings of the intake and the exhaust valves, preferably using variable lift control ('VLC') and variable cam phasing ('VCP') systems. The variable valve lift system comprises devices operative to control valve lift, or opening, to one of two distinct steps, comprising a low-lift valve opening (about 3-6 mm) for an open duration of 120-150 crank angle degrees at low speed, low load operation, and a high-lift valve opening (about 8-10 mm) for an open duration of 220-260 crank angle degrees at high speed, high load operation.

The VCP systems are operable to shift valve opening and closing times relative to crankshaft and piston position, i.e., phasing, beyond that which is effected by the two-step VLC lift depicted with reference to FIG. 1. There is a VCP/VLC system 22 for the engine intake and a VCP/VLC system 24 for the engine exhaust, in this embodiment. The VCP/VLC systems 22, 24 are controlled by the control module 5, and provide signal feedback to the control module consisting of camshaft rotation position for the intake camshaft and the exhaust camshaft. When the engine is operating in an auto-ignition mode with exhaust recompression valve strategy the low lift operation is typically used, and when the engine is operating in a spark-ignition combustion mode the high lift operation typically is used.

As known to skilled practitioners, VCP/VLC systems have a limited range of authority over which opening and closings of the intake and exhaust valves are controllable. The typical VCP system has a range of phasing authority of 30°-90° of cam shaft rotation, thus permitting the control module to advance or retard opening and closing of the engine valves. The range of phasing authority is defined and limited by the hardware of the VCP and the control system which actuates the VCP. The VCP/VLC systems are actuated using one of electro-hydraulic, hydraulic, and electric control force, controlled by the control module 5.

The engine includes a fuel injection system, comprising a plurality of high-pressure fuel injectors 28 each adapted to directly inject a mass of fuel into one of the combustion chambers, in response to an engine control signal ('inj_pw') from the control module. The fuel injectors 28 are supplied with pressurized fuel from a fuel distribution system (not shown).

The engine includes a spark-ignition system by which spark energy is provided to a spark plug 26 for igniting or assisting in igniting cylinder charges in each of the combustion chambers, in response to an engine control signal ('IGN') from the control module. The spark plug 26 enhances the ignition timing control of the cylinder charge under certain operating conditions (e.g., during cold start with either HCCI or SI operation, near a low load HCCI operation limit, and during ordinary SI engine combustion operation). Spark-ignition at a high load operation limit is controlled in the HCCI mode, and at high speed/load operating conditions are controlled under throttled and un-throttled spark-ignition operation.

The engine is equipped with various sensing devices for monitoring engine operating states, including a crankshaft rotational speed sensor 42 having output RPM, a sensor 30 adapted to monitor combustion having output COMBUSTION, and, a sensor 40 adapted to monitor exhaust gases having output EXH, typically a wide range air/fuel ratio sensor, and a coolant sensor 35 having output coolant. The combustion sensor comprises a sensor device operative to monitor a combustion parameter, depicted as a cylinder pressure sensor adapted to monitor in-cylinder combustion pressure. It is understood that other sensing systems used to monitor cylinder pressure or another combustion parameter which translatable into combustion phasing are included within the scope of the invention, e.g., ion-sense ignition systems.

The engine is designed to operate un-throttled on gasoline or similar fuel blends with auto-ignition combustion ('HCCI combustion') over an extended range of engine speeds and loads. The engine operates in the spark-ignition combustion mode with controlled throttle operation with conventional or modified control methods under conditions not conducive to the auto-ignition combustion and to attain maximum engine power to meet an operator torque request (To_req). Widely available grades of gasoline and light ethanol blends thereof are preferred fuels; however, alternative liquid and gaseous fuels such as higher ethanol blends (e.g. E80, E85), neat ethanol (E99), neat methanol (M100), butanol gasoline blends, neat butanol, natural gas, hydrogen, biogas, various reformates, syngases, and others may be used in the implementation of the present invention.

The control module 5 is preferably a general-purpose digital computer generally comprising a microprocessor or central processing unit, storage mediums comprising non-volatile memory including read only memory (ROM) and electrically programmable read only memory (EPROM), random access memory (RAM), a high speed clock, analog to digital (A/D) and digital to analog (D/A) circuitry, and input/output circuitry and devices (I/O) and appropriate signal conditioning and buffer circuitry. The control module has a set of control algorithms, comprising resident program instructions and calibrations stored in the non-volatile memory and executed to provide the respective functions of each computer. The algorithms are typically executed during preset loop cycles such that each algorithm is executed at least once each loop cycle. Algorithms are executed by the central processing unit and are operable to monitor inputs from the aforementioned sensing devices and execute control and diagnostic routines to control operation of the actuators, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event such as a specific crank angle location.

The control module 5 executes algorithmic code stored therein to control the aforementioned actuators to specific control states from predetermined lookup tables and equations stored in memory. This includes controlling: throttle position (ETC); spark timing and dwell (IGN); fuel injection mass and timing, including multiple injections per cycle (Inj_pw); phasing, lift and duration of openings of the intake and/or exhaust valves (VCP/VLC Intake, VCP/VLC Exhaust); and, EGR valve position (EGR) to control flow of recirculated exhaust gases. The phasing, lift and duration of openings of the intake and/or exhaust valves includes negative valve overlap (NVO in an exhaust recompression strategy) and lift of exhaust valve reopening (in an exhaust rebreathing strategy). The control module is adapted to monitor input signals from the operator (e.g., an accelerator pedal position and a brake pedal position) to determine the operator torque request (To_req), and adapted to monitor engine operating states from sensors, including those indicating engine speed (RPM), engine load (using MAF, MAP, or Inj_pw), combustion, coolant temperature (coolant), intake air temperature (Tin) and other ambient conditions to determine an engine operating point, primarily related to engine speed and load. The control module is operative to monitor torque or load and engine speed from which engine power is calculated.

The control module 5 preferably includes a cylinder deactivation system operative to selectively deactivate a subset of the total number of cylinders. In the invention, cylinder deactivation is implemented by selectively disabling fuel delivery from individual fuel injectors, including disabling one bank of cylinders in a V-configured engine. The cylinder deactivation mode may further include disabling opening of the intake and/or exhaust valves concurrent with discontinuing fuel flow to specific cylinders. The control system meets the engine torque command, i.e., the operator torque request, by increasing torque output from the activated cylinders during the period of time when the cylinder deactivation mode is enabled.

Figure 2:
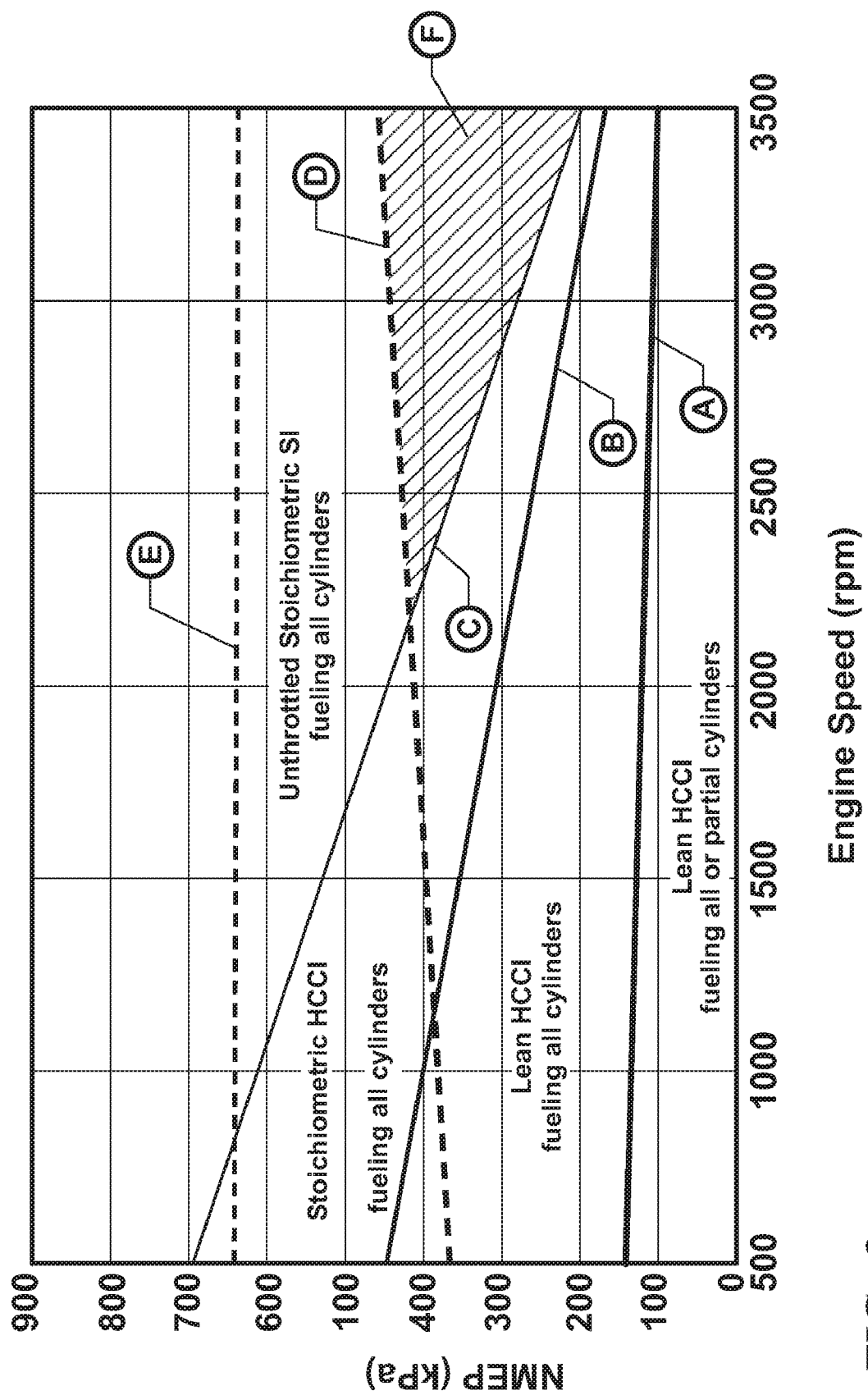

Referring now to FIG. 2, a datagraph depicting areas of engine operation under various conditions is shown for the exemplary engine 10 with variable valve actuation system having dual cam phasers and 2-step lifter system. The exemplary engine is operative in the HCCI mode over a range of engine speeds, in revolutions per minute ('rpm') and load, in net mean effective pressure units of kilopascals ('NMEP (kPa)'). Line A depicts a low speed/low load operating condition, comprising a lower limit for operating the engine in lean HCCI mode. Below Line A, engine operation comprises either conventional spark-ignition operation at stoichiometry, or, lean HCCI operation with deactivated cylinders. An exemplary system for operating thusly has been described in co-assigned U.S. Pat. No. 6,662,785 B1, issued to Sloane, et al, entitled "Method of Operating HCCI Engines at Low Speed and Low Load", which is incorporated by reference herein. Line B depicts an upper limit for operating the engine in lean HCCI mode with all cylinders fueled. Line C depicts an upper limit for operating the engine in a stoichiometric HCCI mode with all cylinders fueled. Line D depicts a lower limit for operating the engine in an unthrottled stoichiometric spark-ignition mode ('SI-NTLC') with all cylinders fueled. The SI-NTLC mode comprises operating by controlling the cam phasers to adjust valve opening/closing timings such that the amount of air induction is controlled without throttling in the air intake system. This, coupled with direct in-cylinder fuel injection, gives a load control mechanism similar to that used in diesel engines. Line D is typically determined based upon engine combustion stability as measured by coefficient of variability of indicated mean effective pressure ('COV-IMEP'). There is an upper limit for operating the engine in the SI-NTLC mode, above which the engine is preferably operated in a throttled stoichiometric SI mode (not shown). The shaded area depicted by the letter F comprises an area in which the engine is incapable of stably operating with low emission in either the HCCI mode or the SI ('Spark-Ignition') mode on all cylinders.

In operation, a transition between the HCCI combustion mode and the SI combustion mode is managed as described hereinbelow, especially in region F. When operating in the region depicted by letter F, the engine is selectively operated in the spark-ignition combustion mode. Thus the VLC/VCP system is controlled to the high-lift engine valve operation concurrent with the selective cylinder deactivation. The engine is controlled to stoichiometric air/fuel ratio operation concurrent with the selective cylinder deactivation. The throttle continues to be controlled in a wide-open position concurrent with the selective cylinder deactivation. Ignition control, comprising spark timing, energy, and dwell are controlled according to predetermined control schemes.

The specifics of the preferred engine operating conditions for transitioning between the HCCI and SI combustion modes is dependent upon specific valve lift and duration profiles for the intake and exhaust camshafts of the engine. The gap, depicted as region F, exists between the highest load reachable in the HCCI mode and the lowest load reachable with SI operation above an engine speed of 2000 rpm. The highest load attainable in the HCCI mode is limited by ringing, i.e., combustion generated noise. The lowest attainable load with SI operation is limited by combustion stability, typically measured by a COV-IMEP of 3%. The HCCI ringing limit results from an inability to induct sufficient charge dilution at the low-lift valve operation. The SI limit results from excessive charge dilution at the high-lift valve operation.

Therefore, when the exemplary system is operating in the stoichiometric HCCI mode and engine load demand exceeds the capability of the engine in the stoichiometric HCCI mode (Line C of FIG. 2) the system determines whether the engine is capable of operating in the SI mode with all cylinders operating, as shown by Line D of FIG. 2. When the engine speed/load operating point precludes such operation, i.e., falls within the region F, the control module operates the engine in the SI mode and initiates cylinder deactivation to deactivate one or more of the cylinders by discontinuing fueling thereto. The remaining active cylinders are operated at a higher engine output torque (increased NMEP) to meet the required engine load requirements and operator torque request while maintaining combustion stability for each actuated cylinder below the upper limit for combustion stability, i.e., COV-IMEP<3%. When the engine speed/load operating point falls outside region F, either above or below, the control module discontinues the cylinder deactivation mode, fueling all cylinders, and controlling the throttle and VLC/VCP devices 22, 24 according to predetermined control schemes and calibrations.

In an alternative embodiment, a three-step valve actuation system is mechanized, comprising the VLC systems 22, 24 wherein there is the first, low step having a 3-5 mm peak lift and 120-150 degree duration for the intake and exhaust valve lift profiles; a second, intermediate step having a 6-8 mm peak lift and 150-180 degree duration for the intake and exhaust valve lift profiles; and, a third, high step having an 9-12-mm peak lift and 220-260 degree duration for the intake and exhaust valve lift profiles. In this embodiment, when the engine is operating in the gap between the HCCI mode and the SI mode, i.e., region F, the three-step valve actuation mechanism is used, with the intermediate lift and duration step used to extend both the high load HCCI and low load SI operating limits. This three step valve actuation system is used individually, or in conjunction with cylinder deactivation. Such an exemplary system increases the upper limit of operating in the HCCI mode and reduces the lower limit of operating in the SI mode, effectively reducing or limiting the region identified on FIG. 2 by the letter F.

The invention has been described with specific reference to the exemplary embodiments and modifications thereto. Further modifications and alterations may occur to others upon reading and understanding the specification. It is intended to include all such modifications and alterations insofar as they come within the scope of the invention.

The invention claimed is:

1. Method to operate a multi-cylinder direct-injection engine, comprising:
   adapting the engine to selectively operate in one of a controlled auto-ignition combustion mode and a spark-ignition combustion mode;
   monitoring engine speed and an operator torque request; and,
   selectively deactivating fuel delivery to a portion of the cylinders and selectively increasing torque output from non-deactivated cylinders to achieve the operator torque request when the operator torque request is within a predetermined, engine speed dependent torque range.

2. The method of claim 1, further comprising:
   adapting the engine to be selectively operative in one of a low-lift and a high-lift engine valve operation; and,
   controlling the engine to the high-lift engine valve operation concurrent with the selective deactivation of fuel delivery to the portion of the cylinders.

3. The method of claim 2, further comprising:
   adapting the engine to be selectively operative at an air/fuel ratio that is one of lean of stoichiometry and substantially stoichiometric; and,
   controlling the engine to the substantially stoichiometric air/fuel ratio concurrent with the selective deactivation of fuel delivery to a portion of the cylinders.

4. The method of claim 1, further comprising:
   adapting the engine to be selectively operative at an air/fuel ratio that is one of lean of stoichiometry and substantially stoichiometric; and,
   controlling the engine to the substantially stoichiometric air/fuel ratio concurrent with the selective deactivation of fuel delivery to a portion of the cylinders.

5. The method of claim 1, further comprising:
   controlling throttle opening to a wide-open position concurrent with the selective deactivation of fuel delivery to a portion of the cylinders.

6. The method of claim 1, further comprising:
   controlling spark timing and dwell of the ignition based upon the engine operation concurrent with the selective deactivation of fuel delivery to a portion of the cylinders.

7. The method of claim 1, further comprising:
   selectively enabling fuel delivery to all of the cylinders when the operator torque request exceeds a second predetermined threshold.

8. Method for transitioning engine operation between a controlled auto-ignition combustion mode and a spark-ignition combustion mode, comprising:
   adapting the engine to be selectively operative in one of a low-lift and a high-lift engine valve operation;
   monitoring engine speed and engine load;
   determining the engine speed is above a predetermined threshold;
   selectively deactivating fuel delivery to a portion of the cylinders and selectively increasing torque output from non-deactivated cylinders to achieve the operator torque request and operating the engine at the high-lift engine valve operation when the engine load is within a predetermined range.

9. The method of claim 8, wherein the predetermined range for the engine load is based upon the engine speed.

10. The method of claim 9, further comprising:
    adapting the engine to be selectively operative at an air/fuel ratio that is one of lean of stoichiometry and substantially stoichiometric; and,
    controlling the engine to the substantially stoichiometric air/fuel ratio concurrent with the selective deactivation of fuel delivery to a portion of the cylinders.

11. The method of claim 8, further comprising:
    controlling throttle opening to a wide-open position concurrent with the selective deactivation of fuel delivery to a portion of the cylinders.

12. The method of claim 11, further comprising:
    controlling spark timing and dwell of the ignition based upon the engine operation concurrent with the selective deactivation of fuel delivery to a portion of the cylinders.

13. The method of claim 8, further comprising:
controlling spark timing and dwell of the ignition based upon the engine operation concurrent with the selective deactivation of fuel delivery to a portion of the cylinders.

14. The method of claim 8, further comprising:
selectively enabling fuel delivery to all of the cylinders when the engine load is outside the predetermined threshold.

15. The method of claim 8, further comprising:
adapting the engine to be selectively operative in one of a low-lift, an intermediate-lift, and, a high-lift engine valve operation; and,
selectively deactivating fuel delivery to a portion of the cylinders and operating the engine at one of the medium-lift and the high-lift engine valve operation and selectively increasing torque output from non-deactivated cylinders based upon an operator torque request.

16. Internal combustion engine, comprising:
a multi-cylinder direct-injection engine, adapted to operate at an air/fuel ratio that is one of lean of stoichiometry and substantially stoichiometric, comprising: a variable valve lift control device selectively operative at one of low valve lift and high valve lift;
a control module, adapted to monitor inputs from a plurality of sensing devices and control a plurality of actuators based upon predetermined control schemes and adapted to cutoff fuel delivery to a portion of the cylinders during ongoing operation;
a control scheme, comprising a computer program encoded therein executable in the control module for controlling operation of the engine, the program comprising:
code to monitor engine operation and an operator torque request;
code to determine engine speed is above a predetermined threshold;
code to effect a transition between a spark-ignition combustion mode and a controlled auto-ignition combustion mode based upon the engine operation when the engine speed is above the predetermined threshold;
wherein the transition comprises:
code to control air/fuel ratio substantially to stoichiometry;
code to command variable valve lift to a high valve lift opening;
code to deactivate the portion of the cylinders by cutting off fuel delivery thereto during ongoing operation;
code to increase fuel delivery to the non-deactivated cylinders to meet the operator torque request;
code to control spark-ignition timing and dwell; and,
code to control throttle to a wide-open position.

17. Method to operate a multi-cylinder direct-injection engine, comprising:
adapting the engine to selectively operate in one of a controlled auto-ignition combustion mode and a spark-ignition combustion mode;
monitoring engine operation and an operator torque request;
selectively deactivating fuel delivery to a portion of the cylinders and selectively increasing torque output from non-deactivated cylinders to achieve the operator torque request when the monitored engine operation is above a predetermined first threshold;
adapting the engine to be selectively operative in one of a low-lift and a high-lift engine valve operation; and
controlling the engine to the high-lift engine valve operation concurrent with the selective deactivation of fuel delivery to the portion of the cylinders.

18. The method of claim 17, further comprising:
adapting the engine to be selectively operative at an air/fuel ratio that is one of lean of stoichiometry and substantially stoichiometric; and,
controlling the engine to the substantially stoichiometric air/fuel ratio concurrent with the selective deactivation of fuel delivery to a portion of the cylinders.

19. Method to operate a multi-cylinder direct-injection engine, comprising:
adapting the engine to selectively operate in one of a controlled auto-ignition combustion mode and a spark-ignition combustion mode;
monitoring engine operation and an operator torque request;
selectively deactivating fuel delivery to a portion of the cylinders and selectively increasing torque output from non-deactivated cylinders to achieve the operator torque request when the monitored engine operation is above a predetermined first threshold;
adapting the engine to be selectively operative at an air/fuel ratio that is one of lean of stoichiometry and substantially stoichiometric; and
controlling the engine to the substantially stoichiometric air/fuel ratio concurrent with the selective deactivation of fuel delivery to a portion of the cylinders.

20. Method to operate a multi-cylinder direct-injection engine, comprising:
adapting the engine to selectively operate in one of a controlled auto-ignition combustion mode and a spark-ignition combustion mode;
monitoring engine operation and an operator torque request;
selectively deactivating fuel delivery to a portion of the cylinders and selectively increasing torque output from non-deactivated cylinders to achieve the operator torque request when the monitored engine operation is above a predetermined first threshold; and
controlling throttle opening to a wide-open position concurrent with the selective deactivation of fuel delivery to a portion of the cylinders.

21. Method to operate a multi-cylinder direct-injection engine, comprising:
adapting the engine to selectively operate in one of a controlled auto-ignition combustion mode and a spark-ignition combustion mode;
monitoring engine operation and an operator torque request;
selectively deactivating fuel delivery to a portion of the cylinders and selectively increasing torque output from non-deactivated cylinders to achieve the operator torque request when the monitored engine operation is above a predetermined first threshold; and
selectively enabling fuel delivery to all of the cylinders when the operator torque request exceeds a second predetermined threshold.

22. Method to operate a multi-cylinder direct-injection engine, comprising:

adapting the engine to selectively operate in one of a controlled auto-ignition combustion mode and a spark-ignition combustion mode;

monitoring an engine speed/load operating point; and selectively deactivating fuel delivery to a portion of the cylinders and selectively operating in the spark-ignition combustion mode when the monitored engine speed/load operating point is within a predetermined speed/load region.

* * * * *